March 30, 1937.  C. A. PIPENHAGEN  2,075,301
LAWN EDGE TRIMMER
Filed June 6, 1936
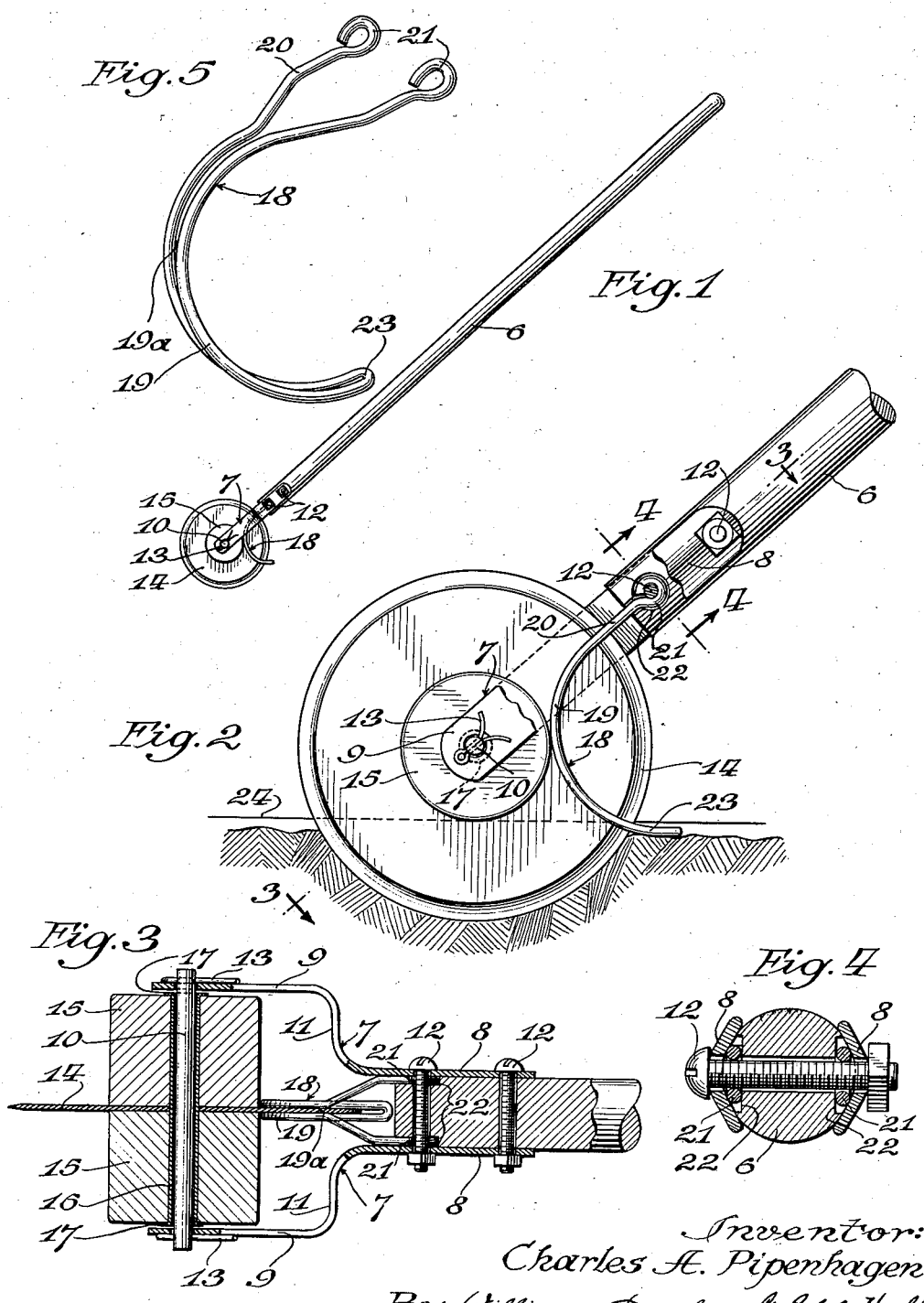
Inventor:
Charles A. Pipenhagen
By Williams, Bradbury, McCaleb + Hinkle
Attys.

Patented Mar. 30, 1937

2,075,301

UNITED STATES PATENT OFFICE 2,075,301

LAWN EDGE TRIMMER

Charles A. Pipenhagen, Chicago, Ill.

Application June 6, 1936, Serial No. 83,828

7 Claims. (Cl. 97—227)

My invention relates to a lawn edge trimmer.

The object of the invention is to provide a manually operable tool, of simple and sturdy construction, which an operator, walking erect or nearly so, may push alongside the edge of a sidewalk or a curb to cause grass-shearing cooperation between the said sidewalk, or curb, and a single rotary knife which spins in the turf (as distinguished from merely rolling therein) by virtue of the fact that the knife is provided with traction rollers, of considerably less diameter than the knife itself,—one of these traction rollers engaging and rolling upon the top of the sidewalk or curb alongside of which the rotary knife is operating.

A salient feature of the invention is a replacer for the turf or top soil which frequently clings to the edge of the knife as it spins out of the turf through which it is progressing. This replacer preferably is in the form of a vertically yieldable wire member which embraces the knife edge, strips lifted turf and soil from the knife, and properly replaces such turf and soil to the places from which lifted.

Other features, objects and advantages of my invention will appear from the following detailed description, wherein reference is made to the accompanying sheet of drawing, in which Fig. 1 is a side elevational view of the trimmer of the present invention;

Fig. 2 is an enlarged fragmentary view, partly in section, showing the rotary knife and the replacer as they appear when progressing alongside of a sidewalk or curb;

Fig. 3 is a sectional view taken in the plane of the line 3—3 of Fig. 2 and looking in the direction indicated by the arrows;

Fig. 4 is a detail section taken on the line 4—4 of Fig. 2; and

Fig. 5 is an isolated perspective view of the turf and soil replacer.

Similar characters of reference refer to similar parts throughout the several views.

The trimmer comprises an elongated handle 6 which is provided at its lower end with a bearing fork comprising two relatively stiff metal strap members 7—7. Each of the strap members 7 comprises a concavo-convex upper end 8 which embraces the lower end of handle 6, an offset lower end 9 which is apertured to receive one end of a shaft 10, and an intermediate portion 11 which is disposed at right angles to the strap ends 8 and 9, and in parallelism with shaft 10. The portions 11 of the strap 7 may be pressed with the foot of the operator to sink the hereinafter mentioned rotary knife into the turf when that cannot be accomplished by force applied at the upper end of the handle. Screw bolts 12—12 rigidly secure the strap ends 8—8 to the lower end of handle 6.

Shaft 10 conveniently is held in the portions 9 of the bearing fork straps by cotter pins 13—13.

Mounted on shaft 10 is a rotatable unit consisting of a circular knife 14, a pair of wooden traction rollers 15—15, and a tubular element 16, which has its ends upset, as indicated at 17—17, firmly to clamp the knife 14 between the traction rollers 15—15. The diameter of each of the traction rollers is considerably less than the diameter of the knife.

I now call attention to the turf and soil replacer which is indicated as a whole by reference numeral 18. This element preferably consists of a piece of relatively heavy wire which is conformed to provide a curved arm 19. This arm 19 consists of two parallel portions of the wire which are slightly spaced apart to provide a slot 19—a for the reception of knife 14. The extremities 20—20 of the wire diverge from each other and present eyes 21—21. These eyes 21—21 encircle the screw bolts 12—12, occupy recesses 22—22 in the lower end of handle 6, and underlie and are firmly clamped to the handle by the portions 8—8 of the fork straps 7. The lower and free extremity 23 of the arm 19 lies closely adjacent to the turf, and trails the knife, when the tool is in operation.

When the tool is used to trim lawn grass which overlies the edge of a sidewalk or curb (indicated at 24 in Fig. 2) the knife 14 is sunk into the turf until one of the traction rollers 15 engages the top of the sidewalk or curb. To accomplish this the operator's foot may be pressed against one of the portions 11—11 of the bearing fork. Then, with the handle upwardly and rearwardly inclined to the hands of the operator, and with the trailing portion 23 of the replacer lying against or closely adjacent to the turf (as indicated in Fig. 2) the operator pushes the tool alongside the sidewalk or curb. When this occurs, that one of the traction rollers 15 which engages the sidewalk or curb serves to spin knife 14 in the turf at a peripheral speed determined by the horizontal progress of the tool and the diameter difference between the knife and such traction roller. As the tool progresses, the knife, having a relatively high peripheral speed, cooperates with the sidewalk or curb neatly to shear the grass which overlies the edge of such sidewalk or curb.

While the knife operates it frequently lifts portions of the turf and top soil. This lifted turf and top soil, however, is scraped from the knife by the slotted arm 19 and is yieldingly replaced by the lower and trailing extremity 23 of such arm. While I prefer to form the replacer 18 of relatively stiff wire, the fact that it is secured only at its upper portions insures that the lower and trailing end 23 of the replacer may yield upwardly when passing over stones, pebbles or uneven turf, or when pressing down turf or top soil lifted by the knife.

Due to the thinness of the knife, it leaves no objectionable trench alongside the sidewalk or curb. To the contrary, it makes a clean incision in the turf which is hardly noticeable and closes almost immediately.

It will thus be understood that I have provided a trimming tool, of simple and sturdy construction, which operates, as a lawn mower cannot, to trim lawn grass which overlies a sidewalk or curb, the trimmer operating to replace any turf and top soil which is lifted by its rotary knife.

What I claim as new and desire to secure by Letters Patent of the United States is:

1. A lawn edge trimmer comprising a rotary knife, a traction roller of less diameter than the knife and in driving relation thereto, a handle member by which the knife and roller are rotatably carried, and a turf and soil replacer carried by the handle, said replacer being slotted to receive the knife and having a lower extremity which trails the knife.

2. In a lawn edge trimmer a rotary knife, a handle member at the lower end of which the knife is rotatably carried, and a turf and soil replacer carried by the handle, said replacer comprising portions lying on each side of the knife and a lower extremity which trails the knife and overlies the turf through which the knife is moved.

3. In a lawn edge trimmer a rotary knife, a handle member at the lower end of which the knife is rotatably carried, and a turf and soil replacer, said replacer having its upper end secured to the lower end of the handle and comprising portions which lie closely adjacent to each side of the knife, said replacer also comprising an upwardly yielding lower end which trails the knife and closely overlies the turf through which the knife is moved.

4. A lawn edge trimmer comprising a rotary knife, a traction roller of less diameter than the knife and in driving relation thereto, a handle member by which the knife and roller are rotatably carried, and a turf and soil replacer, said replacer having its upper end secured to the lower end of the handle and comprising portions which lie closely adjacent to opposite sides of the knife, said replacer also comprising an upwardly yielding lower end which trails the knife and closely overlies the turf through which the knife is moved.

5. A trimmer comprising a rotary unit which includes a rotary knife, a traction roller, a handle at the lower end of which said unit is rotatably carried, and a turf and soil replacer which has its upper end secured to the handle near the lower end of the latter, said replacer comprising portions which lie on opposite sides of the knife, the replacer also comprising a free upwardly yielding lower end which trails the knife and overlies the turf through which the knife is moved.

6. A trimmer comprising a rotary knife, a handle at the lower end of which the knife is rotatably carried, and a turf and soil replacer, said replacer comprising a curved arm slotted to receive the knife and provided with a free and upwardly yielding end which trails the knife and overlies the turf through which the knife is moved.

7. A trimmer comprising a rotary knife, a handle at the lower end of which the knife is rotatably carried, and a turf and soil replacer, said replacer consisting of a single piece of wire having its ends attached to the handle, said wire being conformed to provide a curved arm having portions lying closely adjacent to the knife on opposite sides thereof, and an upwardly yielding lower end which trails the knife and lies closely adjacent to the turf through which the knife is moved.

CHARLES A. PIPENHAGEN.